United States Patent Office 3,235,361
Patented Feb. 15, 1966

3,235,361
METHOD FOR THE CONTROL OF UNDESIRABLE VEGETATION
Harvey M. Loux, Hockessin, Del., assignor to E. I. du Pont de Nemours and Company, Wilmington, Del., a corporation of Delaware
No Drawing. Filed Oct. 29, 1962, Ser. No. 233,952
11 Claims. (Cl. 71—2.5)

This application is a continuation-in-part of copending application Serial No. 167,434, filed February 1, 1962, which in turn is a continuation-in-part of applications Serial No. 89,671, filed February 16, 1961; Serial No. 12,967, filed March 7, 1960, and Serial No. 833,705, filed August 14, 1959, all now abandoned.

SCOPE

This invention relates to the use of 3,6-substituted uracils and their salts as herbicides, and to the amine salts and phenol complexes of these uracils as new compounds.

More particularly, this invention directed to herbicidal compositions and methods employing compounds of the formula (1) 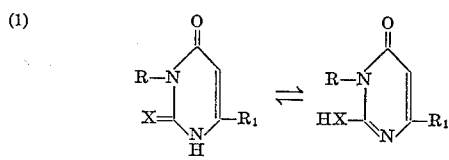

where

R is a cycloalkyl radical containing 3 through 12 carbon atoms, a cycloalkenyl radical containing 4 through 12 carbon atoms, a cycloalkyl alkyl radical containing 4 through 13 carbon atoms or a cyloalkenyl alkyl radical containing 4 through 13 carbon atoms;
$R_1$ is an alkyl radical containing 1 through 5 carbon atoms; and
X is oxygen or sulfur.

The salts of these compounds can also be used according to this invention. By "salts" is meant those compounds formed with such cations as sodium, potassium, lithium, calcium, magnesium, barium, strontium, iron, manganese and quaternary ammonium.

Some of the uracils of Formula 1 also form novel 1:1 addition compounds with nitrogenous bases. The exact structure of these compounds is not known, but they are, according to the best available information, believed to be essentially salt-like in structure. They will be symbolized by the following formula, with the understanding that it is representative only, and is not intended to illustrate actual structure:

(2) 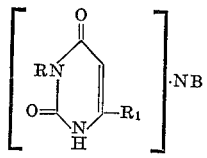

where:

R and $R_1$ are defined as in Formula 1, and
NB is a nitrogenous base having an ionization constant $K_b$ of $\geq 10^{-9}$ in water.

Suitable nitrogenous bases are substituted, unsubstituted, cyclic and acyclic

Amines,
Amidines, and
Guanidines

The amines can be primary, secondary or tertiary amines, polyamines, arylamines, or heterocyclicamines. Illustrative of such amines are:

Sec.-butylamine
2-amino-2-methyl-1,3-propanediol
Trimethylenediamine
Ethanolamine
Dodecylamine
Ethylenediamine
Hexamethylenediamine
Cocodiamine
Tallowdiamine
Hexamethyleneimine
Cyclohexylamine
Methoxypropylamine
Methylamine
Dimethylamine
Trimethylamine
Ethylamine
Propylamine
Butylamine
Octylamine
Pyridine
Piperidine
Tetramethylguanidine
Acetamidine
Benzylamine
Diethylenediamine
2-aminobutanol-1
2-aminooctanol-1
Oleyldiamine
Sec.-butylamine Certain uracils of Formula 1 also form novel water stable complexes with phenol and substituted phenols. These complexes have the formula (3) 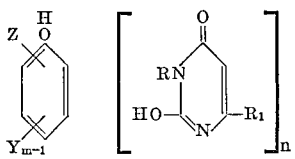

where

R and $R_1$ are as defined in Formula 1,
Z is hydrogen, chlorine, nitro, alkyl of 1 through 3 carbon atoms, bromine or $-OR_2$,
$R_2$ is alkyl of 1 through 3 carbon atoms,
Y is chlorine or alkyl of 1 through 3 carbon atoms,
$m$ is a number from 1 through 5, and
$n$ is 1 or 2.

These complexes are also herbicidal, and in this respect, have some advantages over the uracils themselves, viz., higher solubility in oils and solvents. They are formulated into herbicidal compositions in the same way as are the uracils.

In Formulae 1 through 3 the terms "cycloalkyl," "cycloalkenyl," "cycloalkyl alkyl," and "cycloalkenyl alkyl" will include but are not limited to Cyclohexyl
Cyclohexenyl
Cyclohexylalkyl
Cyclohexenyl alkyl
Cyclopentyl
Cyclopentenyl
Cyclopentyl alkyl
Cyclopentenyl alkyl
Cycloheptyl
Cycloheptenyl
Cyclooctyl
Norbornyl
Norbornenyl
Norbornyl alkyl
Norbornenyl alkyl
Bicylo(2,2,2)octyl
Bicyclo(2,2,2)octenyl
Bicyclo(2,2,2)octyl alkyl
Bicyclo(2,2,2)octenyl alkyl
Cyclopropyl
Cyclobutyl
Cyclobutylalkyl
Cyclobutenyl
Cyclobutenylalkyl
Indanyl
Hexahydroindenyl
Tetrahydroindanyl
Hexahydroindenyl alkyl
Hexahydroindanyl
Tetrahydroindanyl alkyl
Hexahydroindanyl alkyl
Hexahydro-4,7-methanoindenyl
Hexahydro-4,7-methanoindenyl alkyl
Hexahydro-4,7-methanoindanyl
Tetrahydro-4,7-methanoindanyl
Hexahydro-4,7-methanoindanyl alkyl
Tetrahydro-4,7-methanoindanyl alkyl
Decahydronaphthyl
Decahydronaphthyl alkyl
Tetrahydronaphthyl
Tetrahydronaphthyl alkyl
Decahydro-1,4-methanonaphthyl
Decahydro-1,4-methanonaphthyl alkyl
Octahydro-1,4-methanonaphthyl
Octahydro-1,4-methanonaphthyl alkyl
Decahydro-1,4,5,8-dimethanonaphthyl
Decahydro-1,4,5,8-dimethanonaphthyl alkyl
Octahydro-1,4,5,8-dimethanonaphthyl
Octahydro-1,4,5,8-dimethanonaphthyl alkyl These cyclic substituents can be further substituted with lower alkyl groups, methoxy, chlorine and bromine.

UTILITY

The uracils of Formulae 1 to 3 exert herbicidal activity on a broad spectrum of plants. This indicates their usefulness as general purpose weed killers or soil sterilants for control of vegetation on industrial sites and railroad ballast.

Certain of the uracils also exhibit selective herbicidal action in crops. By properly selecting a uracil of the invention and a rate and time of application, weeds growing in such crops as sugarcane and sorghum can be controlled.

The amount of herbicide to be used in any instance will be governed by such factors as climate, the type of weed to be controlled, soil conditions, and the like, and so it is not possible to give a rate of application suitable for all situations. Generally speaking, one uses the uracils at levels of 0.25 to 3 pounds per acre for selective control in crops. Rates of 5 to 30 pounds per acre are satisfactory for general weed control.

PREPARATION OF COMPOUNDS

The substituted uracils of Formula 1 can be prepared according to the equations which follow:

(4) 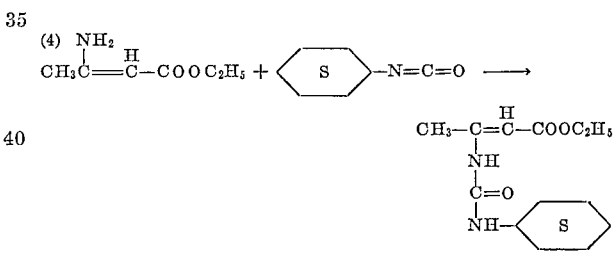

(5) 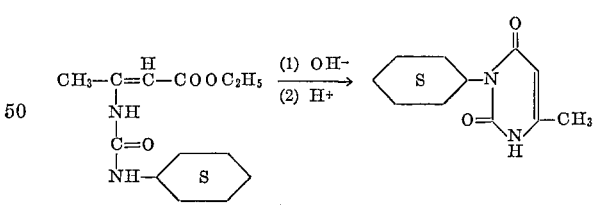

Generally, esters of $\beta$-amino-$\alpha,\beta$-unsaturated acids can be prepared by reacting the corresponding $\beta$-keto esters with aqueous ammonia [Enrod and Epstein, Ber., 20, 3054 (1887)]. The properly substituted $\beta$-amino-$\alpha$-$\beta$-unsaturated esters are then reacted with a cycloalkyl isocyanate or isothiocyanate in an inert solvent such as toluene or xylene for a short interval of time at reflux temperature. The reaction mixture is chilled, filtered, and the filtrate distilled to remove the solvent. Generally, a viscous liquid or solid residue remains [crude $\beta$-(3-cycloalkylureido)-$\alpha,\beta$-unsaturated ester] which can be reacted without further purification with an alcoholic alkaline solution at reflux temperature to bring about the desired ring closure. At this point the reaction mixture is made acidic with a strong acid such as hydrochloric acid and distilled to remove most of the alcohol. Upon chilling the remaining aqueous solution, the corresponding substituted uracil separates out as an essentially pure solid.

The ureido compounds referred to above can exist in either or both of two tautomeric forms, as illustrated in Equation 6:

(6) 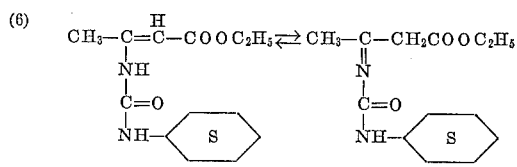

Another method for the preparation of the compounds of Formula 1 is illustrated by the following equations:

(7)
(8)
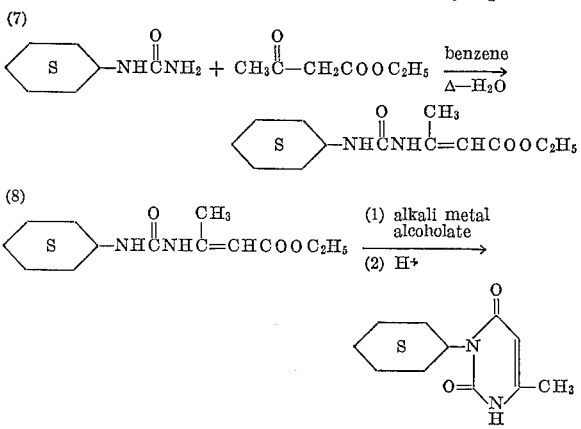

In this method, the appropriately substituted urea or thiourea is reacted with a β-keto ester and an acid catalyst at reflux temperature in a solvent from which water is removed continuously. After all the water has been removed, the solution is stripped and taken up in ethanol containing a base, such as sodium methoxide. After a few minutes reflux, the solvent is removed and the residual oil taken up in water and acidified, whereupon the desired uracil product separates in crystalline form.

The product formed after the water has been removed is the ureido compound of the type referred to in Equation 6. It can be isolated and purified if desired; however, this is not necessary nor advantageous.

The salts of the compounds of Formula 1 are prepared by dissolving the free uracil in an aqueous or nonaqueous solution of at least an equimolar amount of a base or basic salt containing the desired cation. For example, a sodium salt can be prepared by dissolving the uracil in water containing an equimolar amount of sodium hydroxide. The salt can then be isolated from the solution by removal of water.

The uracil salts which are not soluble in water can be prepared by treating an aqueous solution of an alkali metal salt of the uracil with an aqueous solution of a salt having the desired cation.

The quaternary ammonium salts of the compounds of Formula 1 are prepared by reacting the substituted uracil with an appropriate quaternary ammonium hydroxide. Since these hydroxides are generally available in solution, the reaction is most conveniently carried out in the same solvent. The salt is isolated by removing the solvent.

Alternatively, the quaternary ammonium salts can be prepared by first preparing the sodium salt of the uracil in a dry inert solvent such as toluene or xylene. The appropriate quaternary ammonium halide is added with stirring and, if necessary, mild heating. The sodium halide which forms is removed by filtration, leaving the quaternary ammonium salt of the uracil in solution. If desired, the dry salt can be isolated by removing the solvent, preferably in vacuo.

The nitrogenous base-uracil addition compounds of Formula 2 are prepared by mixing an appropriate uracil with a 4 to 20-fold weight excess of nitrogenous base. The mixture is heated gently until a clear solution forms. The addition compound is stable in the presence of the excess amine.

The complexes of Formula 3 are formed by co-melting the uracil and phenol in a 1:1 to 2:1 (uracil:phenol) ratio. They can also be formed by co-dissolving the reactants, in the same ratio, in a nonpolar solvent such as nitromethane or a mixture of nitromethane and cyclohexane.

When the phenol complexes are formed by co-melting, it is not necessary to further purify the reaction product for herbicidal use. If a solvent is used in the preparation, the complex can be isolated by either filtration or evaporation of the solvent in vacuo. The complexes so obtained are suitable for herbicidal use without further purification.

HERBICIDAL COMPOSITIONS

The uracils described in Formulae 1 through 3 can be prepared for use by incorporating them with adjuvants.

The amount of herbicide in such preparations can vary over a wide range according to need. Generally speaking, they will contain from about 0.5 to 95%, by weight, of a uracil.

Powder and dust preparations can be made by mixing uracils of the invention with finely-divided solids such as talcs, natural clays, pyrophyllitet, diatomaceous earth; flours such as walnut shell, wheat, redwood, soya bean and cotton seed; or inorganic substances such as magnesium carbonate, calcium carbonate, calcium phosphate, sulfur and lime. These preparations are made by thoroughly blending the active ingredient and the solid. The particles in such preparations are preferably less than 50 microns in average diameter.

Water-soluble powders can be prepared by blending a suitable uracil with such water-soluble alkaline powders as silicates, carbonates, phosphates or hydroxides, and optionally with water-soluble diluents such as urea or dextrose.

Granules and pellets can be made by mixing a finely-divided uracil with a suitable clay, moistening this mixture with from 15 to 20% by weight of water, and then extruding the mass through a suitable die under pressure. The extrusions are cut into pre-determined lengths and then dried. These pellets can be granulated if desired.

Granules or pellets can also be prepared by spraying a suspension or solution of a uracil onto the surface of a preformed granule of clay, vermiculite or other suitable granular material. If the uracil is in solution, it will penetrate into the pores of the granule and so will adhere without the aid of a binding agent. When the active material is insoluble in the liquid and is carried as a suspension, it is preferable that a binding agent such as goulac, dextrin, swollen starch, glue or polyvinyl alcohol be added. In either case, the granule is then dried and ready for use.

The uracils can also be prepared in non-aqueous liquids. Aliphatic and aromatic hydrocarbons, especially those derived from petroleum and having boiling points of from 125° C. to 400° C. are preferred. Hydrocarbons having lower boiling points should not be used because of their undesirable volatilization characteristics and inflammability. These liquid preparations are made by milling the components in a mill such as a pebble mill until the particles have average diameters of from 1 to 50 microns, preferably 5 to 20 microns.

The herbicidal preparations, whatever physical form they take, can also contain a surface-active agent. The surfactant renders the preparations readily dispersible in liquids and improves their action on waxy leaves and the like. For general application, surface-active agents are used in the preparations at concentrations of from about 1 to 10%, by weight. Levels of from 0.5 to 6 parts of surfactant for each part of uracil, however, give unusual and unexpected results. Preparations having these higher levels of surfactants show greater herbicidal effectiveness than can be expected from a consideration of activity of the components used separately.

The term "surface-active agent" is intended to include wetting agents, dispersing agents, suspending agents and emulsifying agents. Surface-active agents suitable for use are set forth in "Detergents and Emulsifiers... up-to-date," 1962, John W. McCutcheon, Inc., Morristown, New Jersey. Other surface-active agents which can be used in these preparations are listed in U.S. Patents 2,139,-276; 2,412,510; 2,426,417; 2,655,447; and Bulletin E-607 of the Bureau of Entomology and Plant Quarantine of the U.S. Department of Agriculture.

The preparations can also contain adhesives, corrosion inhibitors, antifoam agents, dyes and pigments, anticaking agents, and hard water stabilizers.

The alkali metal salts of the compounds of Formula 1 are especially advantageous for use as herbicides because they are soluble in water and can be applied as aqueous solutions.

With respect to the nitrogenous base-addition compounds of Formula 2, it has been found that preparation with polar low-molecular weight amines such as ethanolamines, propanolamines and butanolamines, gives addition compounds which are extendable in water when the amine is present in excess. Other amines, such as piperidine and octanolamines give addition compounds, in an excess of the amine, which are soluble in both water and hydrocarbon solvents. At the other end of the scale, amines such as dodecylamines, oleyldiamines and tallowamines give addition compounds, in the presence of an excess of the amine, which have high hydrocarbon solubility.

Thus, it is apparent that by properly selecting an amine and forming an addition compound with it, uracils of Formula 2 can be formulated as aqueous solutions or as oil-emulsifiable or oil-extendable formulations. In this way, the nitrogenous base-addition compounds give formulation and application advantages, while still maintaining the desirable herbicidal characteristics of the parent uracils.

FORMULATION WITH OTHER HERBICIDES

The herbicidal compositions of this invention can be formulated to contain two or more of the uracils. They can also be formulated to contain other known herbicides in addition to the uracils to give compositions which have advantages over the components, used separately.

Among the known herbicides which can be combined with the uracils of Formula 1 are:

SUBSTITUTED UREAS 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the uracils of this invention in proportions of from 1:6 to 4:1, respectively, the preferred ratio being 1:3 to 2:1.

SUBSTITUTED TRIAZINES 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the uracils of this invention in proportions of from 1:6 to 4:1, respectively, the preferred ratio being 1:3 to 2:1.

PHENOLS

Dinitro-o-sec.-butylphenol and its salts
Pentachlorophenol and its salts

These phenols can be mixed with the uracils of this invention in the proportions of 1:10 to 10:1, respectively, the preferred ratio being 1:5 to 5:1.

CARBOXYLIC ACIDS AND DERIVATIVES

The following carboxylic acids and derivatives can be mixed with the uracils of this inveniton in the listed proportions:

A. 2,3,6-trichlorobenzoic acid and its salts
   2,3,5,6-tetrachlorobenzoic acid and its salts
   2-methoxy-3,5,6-trichlorobenzoic acid and its salts
   2-methoxy-3,6-dichlorobenzoic acid and its salts
   3-amino-2,5-dichlorobenzoic acid and its salts
   3-nitro-2,5-dichlorobenzoic acid and its salts
   2-methyl-3,6-dichlorobenzoic acid and its salts
   2,4-dichlorophenoxyacetic acid and its salts and esters
   2,4,5-trichlorophenoxyacetic acid and its salts and esters
   (2-methyl-4-chlorophenoxy)acetic acid and its salts and esters
   2-(2,4,5-trichlorophenoxy)propionic acid and its salts and esters
   2-(2,4,5-trichlorophenoxy)ethyl 2,2 - dichloropropionate
   4-(2,4-dichlorophenoxy)butyric acid and its salts and esters
   4-(2-methyl - 4 - chlorophenoxy)butyric acid and its salts and esters
   2,3,6-trichlorobenzyloxypropanol Mixed in a 1:20 to 8:1 ratio, preferably a 1:4 to 4:1 ratio.

B. 2,6-dichlorobenzonitrile

Mixed in a 1:4 to 4:1 ratio, preferably a 1:3 to 3:1 ratio.

C. Trichloroacetic acid and its salts

Mixed in a 1:5 to 20:1 ratio, preferably a 1:2 to 6:1 ratio.

D. 2,2-dichloropropionic acid and its salts

Mixed in a 1:4 to 8:1 ratio, preferably a 1:2 to 4:1 ratio.

E. N,N-di(n-propyl)thiolcarbamic acid, ethyl ester
   N,N-di(n-propyl)thiolcarbamic acid, n-propyl ester
   N-ethyl-N-(n-butyl)thiolcarbamic acid, ethyl ester
   N-ethyl-N-(n-butyl)thiolcarbamic acid, n-propyl ester Mixed in a 1:2 to 24:1 ratio, preferably a 1:1 to 12:1 ratio.

F. N-phenylcarbamic acid, isopropyl ester
   N-(m-chlorophenyl)carbamic acid, isopropyl ester
   N-(m-chlorophenyl)carbamic acid, 4 - chloro - 2 - butynyl ester Mixed in a 1:2 to 24:1 ratio, preferably a 1:1 to 12:1 ratio.

G. 2,3,6-trichlorophenylacetic acid and its salts

Mixed in a 1:20 to 8:1 ratio, preferably a 1:4 to 4:1 ratio.

H. 2-chloro-N,N-diallylacetamide
   Maleic hydrazide

Mixed in a 1:2 to 10:1 ratio, preferably a 1:1 to 5:1 ratio.

INORGANIC AND MIXED INORGANIC-ORGANIC SALTS

The following salts can be mixed with the uracils of this invention in the listed respective proportions:

A. Calcium propylarsonate
   Disodium monomethylarsonate
   Octyl-dodecylammoniummethylarsonate
   Dimethylarsinic acid Mixed in a 1:4 to 4:1 ratio, preferably a 1:2 to 2:1 ratio.

B. Sodium arsenite

Mixed in a 1:10 to 40:1 ratio, preferably a 1:5 to 25:1 ratio.

C. Lead arsenate
   Calcium arsenate

Mixed in a 150:1 to 600:1 ratio, preferably a 100:1 to 400:1 ratio.

D. Sodium tetraborate hydrated, granulated
   Sodium metaborate
   Sodium pentaborate
   Polyborchlorate
   Unrefined borate ore such as borascu Mixed in a 3:1 to 1500:1 ratio, preferably a 6:1 to 1000:1 ratio.

E. Ammonium thiocyanate

Mixed in a 1:10 to 20:1 ratio, preferably a 1:5 to 5:1 ratio.

F. Sodium chlorate

Mixed in a 1:1 to 40:1 ratio, preferably a 2:1 to 20:1 ratio.

G. Ammonium sulfamate

Mixed in a 1:1 to 100:1 ratio, preferably a 1:1 to 50:1 ratio.

OTHER ORGANIC HERBICIDES

The following herbicides can be mixed with the uracils of this invention in the listed respective proportions:

A. 5,6-dihydro-(4A,6A) - dipyrido-(1,2-A,2',1'-C) pyrazinium dibromide

Mixed in a 1:20 to 16:1 ratio, preferably a 1:5 to 5:1 ratio.

B. 3-amino-1,2,4-triazole

Mixed in a 1:20 to 20:1 ratio, preferably a 1:5 to 5:1 ratio.

C. 3,6-endoxohexahydrophthalic acid

Mixed in a 1:4 to 20:1 ratio, preferably a 1:2 to 10:1 ratio.

D. Hexachloroacetone

Mixed in a 1:2 to 16:1 ratio, preferably a 1:1 to 8:1 ratio.

E. Diphenylacetonitrile
   N,N-dimethyl-α,α-diphenylacetamide
   N,N-di-n-propyl-2,6-dinitro-4-trifluoromethylaniline
   N,N-di-n-propyl-2,6-dinitro-4-methylaniline Mixed in a 1:10 to 30:1 ratio, preferably a 1:5 to 20:1 ratio.

F. O-(2,4-dichlorophenyl)-O-methyl-isopropylphosphor-amidothiate
   2,3,5,6-tetrachloroterephthalic acid, dimethyl ester Mixed in a 1:4 to 20:1 ratio, preferably a 1:3 to 15:1 ratio.

OTHER SUBSTITUTED URACILS

The uracils used according to this invention can also be mixed with other substituted uracils, in the respective proportions listed below. Methods for the preparation of the listed uracils can be found in copending applications Serial Nos. 217,521, filed August 17, 1961; 89,672 and 89,674, filed February 16, 1961; 148,819, filed October 31, 1961; and 221,890, filed September 6, 1962.

A. 3-(3a,4,5,6,7,7a-hexahydro-4,7-methano-5-indenyl)-5-bromo-6-methyluracil and salts
   3-norbornyl-5-bromo-6-methyluracil and salts
   3-isopropyl-5-bromo-6-methyluracil and salts
   3-isopropyl-5-chloro-6-methyluracil and salts
   3-sec.-butyl-5-bromo-6-methyluracil and salts
   3-sec.-butyl-5-chloro-6-methyluracil and salts
   3-cyclohexyl-5-bromo-6-methyluracil
   3-cyclohexyl-5-chloro-6-methyluracil
   3-tert-butyl-5-bromo-6-methyluracil
   3-tert-butyl-5-chloro-6-methyluracil Mixed in a 1:4 to 4:1 ratio, preferably a 1:2 to 2:1 ratio.

B. 3-cyclohexyl-5,6-trimethyleneuracil
   3-sec.-butyl-5,6-trimethyleneuracil
   3-isopropyl-5,6-trimethyleneuracil
   3-isopropyl-5,6-tetramethyleneuracil
   3-isopropyl-5,6-pentamethyleneuracil.

Mixed in a 1:6 to 6:1 ratio, preferably a 1:4 to 4:1 ratio.

C. 3-isopropyl-5-bromouracil
   3-sec.-butyl-5-bromouracil
   3-sec.-butyl-5-chlorouracil
   3-cyclohexyl-5-bromouracil
   3-cyclohexyl-5-chlorouracil Mixed in a 1:4 to 4:1 ratio, preferably a 1:2 to 2:1 ratio.

D. 3-isopropyl-1-trichloromethylthio-5-bromo-6-methyluracil
   3-cyclohexyl-1-trichloromethylthio-5-bromo-6-methyluracil
   3-sec.-butyl-1-acetyl-5-bromo-6-methyluracil
   3-isopropyl-1-acetyl-5-bromo-6-methyluracil
   3-isopropyl-1-trichloromethylthio-5-chloro-6-methyluracil Mixed in a 1:4 to 4:1 ratio, preferably a 1:2 to 2:1 ratio.

E. 3-isopropyl-6-methyluracil
   3-sec.-butyl-6-methyluracil

Mixed in a 1:4 to 4:1 ratio, preferably a 1:2 to 2:1 ratio.

EXAMPLES

In order that the invention may be better understood, the following examples are given:

PREPARATION OF COMPOUNDS

*Example 1.—Preparation of 3-cyclohexyl-6-methyluracil*

A mixture consisting of 300 parts of xylene, 51.6 parts of ethyl 3-aminocrotonate, and 50 parts of cyclohexyl isocyanate was heated under reflux for 1½ hours. The xylene was removed under reduced pressure and the residual oil taken up in 190 parts of ethanol. The ethanol solution was then added to a boiling solution of 46 parts of sodium hydroxide in 335 parts of water. The resulting mixture was heated at reflux for 10 minutes, cooled to about 60° C., acidified with concentrated hydrochloric acid, and further cooled to 0° C. The solid which separated was collected by filtration and washed well with water. It then was slurried in 250 parts of 2 N sodium hydroxide and a small amount of insoluble material filtered off. This filtrate was acidified with concentrated hydrochloric acid and the resulting white crystalline solid collected by filtration and air-dried to give 12.5 parts of pure 3-cyclohexyl-6-methyluracil, melting at 235–236° C.

The following compounds are similarly prepared by substituting equivalent amounts of the amino esters and equivalent amounts of the isocyanates set forth in the following table for the ethyl 3-aminocrotonate and cyclohexyl isocyanate:

solution is decanted from the small amount of phosphoric acid and the solvent is removed in vacuo, leaving a viscous oil. This oil is then treated with 500 parts of ethanol and 39.8 parts of sodium methoxide, and the resulting solution heated at reflux for 10 minutes. It is then concentrated to a viscous oil, taken up in water, and washed with ether to remove any ether-soluble impurities. The aqueous layer is acidified to pH 3.8 with concentrated hydrochloric acid, whereupon a white crystalline solid separates. This is collected and recrystallized from ethanol to give 78.1 parts of pure 3-cyclopentyl-6-methyluracil, melting at 236–237° C.

The following compounds are similarly prepared by

| Amino esters | Parts by weight | Isocyanate | Parts by weight | Substituted uracil product |
|---|---|---|---|---|
| Ethyl 3-aminocrotonate | 51.6 | Cyclopentyl | 44.4 | 3-cyclopentyl-6-methyluracil. |
| Do | 51.6 | Cyclopenten-2-yl | 43.6 | 3-cyclopenten-2-yl-6-methyluracil. |
| Methyl 3-amino-3-ethylacrylate | 51.6 | Cyclohexyl | 50.0 | 3-cyclohexyl-6-ethyluracil. |
| Do | 51.6 | Cyclopentyl | 44.4 | 3-cyclopentyl-6-ethyluracil. |
| Do | 51.6 | Cyclopenten-2-yl | 43.6 | 3-cyclopenten-2-yl-6-ethyluracil. |
| Methyl 3-amino-3-propylacrylate | 57.2 | Cyclohexyl | 50.0 | 3-cyclohexyl-6-propyluracil. |
| Do | 57.2 | Cyclopentyl | 44.4 | 3-cyclopentyl-6-propyluracil. |
| Do | 57.2 | Cyclopenten-2-yl | 43.6 | 3-cyclopenten-2-yl-6-propyluracil. |
| Methyl 3-amino-3-butylacrylate | 62.8 | Cyclohexyl | 50.0 | 3-cyclohexyl-6-butyluracil. |
| Do | 62.8 | Cyclopentyl | 44.4 | 3-cyclopentyl-6-butyluracil. |
| Do | 62.8 | Cyclopenten-2-yl | 43.6 | 3-cyclopenten-2-yl-6-butyluracil. |

*Example 2.—Preparation of 3-cyclopentyl-6-methyluracil*

A solution of 96 parts of cyclopentylurea, 97 parts of ethyl acetoacetate, and 2 parts of 85% orthophosphoric acid in 750 parts of benzene is heated under reflux for a period of 24 hours, during which time water is collected from the distillate. After all the water has separated, the substituting equivalent amounts of the β-keto esters and equivalent amounts of the cycloalkylureas or cycloalkylthioureas set forth in the following list for the ethyl acetoacetate and cyclopentylurea:

| β-Keto esters | Parts by weight | Urea or thiourea | Parts by weight | Substituted uracil product |
|---|---|---|---|---|
| Ethyl acetoacetate | 95 | Cyclohexylthiourea | 118 | 3-cyclohexyl-6-methyl-2-thiouracil. |
| Do | 95 | Cycloheptenylthiourea | 127 | 3-cycloheptenyl-6-methyl-2-thiouracil. |
| Do | 95 | Cycloheptylthiourea | 127 | 3-cycloheptyl-6-methyl-2-thiouracil. |
| Do | 95 | Cyclooctylthiourea | 138 | 3-cyclooctyl-6-methyl-2-thiouracil. |
| Do | 95 | Cyclohexenylurea | 107 | 3-cyclohexenyl-6-methyluracil. |
| Ethyl 3-ketohexanoate | 119 | Cyclooctenylurea | 125 | 3-cyclooctenyl-6-propyluracil. |
| Ethyl acetoacetate | 95 | Cyclopentylthiourea | 109 | 3-cyclopentyl-6-methyl-2-thiouracil. |
| Ethyl 3-ketoheptanoate | 130 | Cycloheptenylurea | 115 | 3-cycloheptenyl-6-butyluracil. |
| Ethyl acetoacetate | 95 | Cyclooctenylurea | 125 | 3-cyclooctenyl-6-methyluracil. |

The following uracils are also prepared as in Example 2 by substituting equivalent amounts of the listed substituted urea reactants for the cyclopentylurea:

| Urea reactant | Uracil product |
|---|---|
| Norbornylurea | 3-norbornyl-6-methyluracil. |
| Norbornylmethylurea | 3-norbornylmethyl-6-methyluracil. |
| Norbornenylurea | 3-norbornenyl-6-methyluracil. |
| Norbornenylmethylurea | 3-norbornenylmethyl-6-methyluracil. |
| Cyclohexylmethylurea | 3-cyclohexylmethyl-6-methyluracil. |
| (2-methylcyclohexyl)urea | 3-(2-methylcyclohexyl)-6-methyluracil. |
| 2,4-dimethylcyclohexylurea | 3-(2,4-dimethylcyclohexyl)-6-methyluracil. |
| (3-methylcyclohexyl)urea | 3-(3-methylcyclohexyl)-6-methyluracil. |
| Bornylurea | 3-bornyl-6-methyluracil. |
| Fenchylurea | 3-(fenchyl-6-methyluracil. |
| (2-methoxycyclohexyl)urea | 3-(2-methoxycyclohexyl)-6-methyluracil. |
| 3-cyclohexan-1-ylmethylurea | 3-(3-cyclohexen-1-ylmethyl)-6-methyluracil. |
| 4-methoxy-3-cyclohexen-1-ylmethylurea | 3-(4-methoxy-3-cyclohexen-1-ylmethyl)-6-methyluracil. |
| 1,2-dimethylcyclopentylurea | 3-(1,2-dimethylcyclopentyl)-6-methyluracil. |
| α-Methyl-1-cyclopenten-1-ylethylurea | 3-(α-methyl-1-cyclopenten-1-ylethyl)-6-methyluracil. |
| Chloronorbornylurea | 3-(chloronorbornyl)-6-methyluracil. |
| 3-propyl-2-norcamphanylurea | 3-(3-propyl-2-norcamphanyl)-6-methyluracil. |
| Bicyclo[2,2,2]oct-2-ylurea | 3-(bicyclo[2,2,2]oct-2-yl)-6-methyluracil. |
| Bicyclo[3,2,1]oct-3-ylurea | 3-(bicyclo[3,2,1]oct-3-yl)-6-methyluracil. |
| Bicyclo[2,2,2]oct-2-ylmethylurea | 3-(bicyclo[2,2,2]oct-2-ylmethyl)-6-methyluracil. |
| Bicyclo[2,2,2]oct-5-en-2-ylurea | 3-(bicyclo[2,2,2]oct-5-en-2-yl)-6-methyluracil. |
| α-Ethylbicyclo[2,2,2]oct-5-enylmethylurea | 3-(α-ethylbicyclo[2,2,2]oct-5-enylmethyl)-6-methyluracil. |
| 6-methoxy-3,3-dimethyl-1-indanylurea | 3-(6-methoxy-3,3-dimethyl-1-indanyl)-6-methyluracil. |
| 3a,4,5,6,7,7a-hexahydro-1-indanylurea | 3-(3a,4,5,6,7,7a-hexahydro-1-indanyl)-6-methyluracil. |
| 3,4-dimethylcyclohexylurea | 3-(3,4-dimethylcyclohexyl)-6-methyluracil. |
| 2-(3a,4,5,6,7,7a-hexahydro-5-indanyl)ethylurea | 3-[2-(3a,4,5,6,7,7a-hexahydro-5-indanyl)ethyl]-6-methyluracil. |
| Hexahydro-5-indanylmethylurea | 3-(hexahydro-5-indanylmethyl)-6-methyluracil. |
| α-Decahydronaphthylurea | 3-(α-decahydronaphthyl)-6-methyluracil. |
| β-Decahydronaphthylurea | 3-(β-decahydronaphthyl)-6-methyluracil. |
| 1,2,3,4-tetrahydronaphth-1-ylurea | 3-(1,2,3,4-tetrahydronaphth-1-yl)-6-methyluracil. |
| Cyclohexenylethylurea | 3-cyclohexenylethyl-6-methyluracil. |
| 1-(5,6,7,8-tetrahydronaphth-1-yl)urea | 3-(5,6,7,8-tetrahydronaphth-1-yl)-6-methyluracil. |
| (5,6,7,8,9,9-hexachloro-1,2,3,4,4a,5,8,8a-octahydro-5,8-methano-2-naphthylmethyl)urea | 3-(5,6,7,8,9,9-hexachloro-1,2,3,4,4a,5,8,8a-octahydro-5,8-methano-2-naphthylmethyl)-6-methyluracil. |
| (5,6,7,8,10,10-hexachloro-1,2,3,4,4a,5,8,8a-octahydro-1,4,5,8-dimethano-2-naphthyl)urea. | 3-(5,6,7,8,10,10-hexachloro-1,2,3,4,4a,5,8,8a-octahydro-1,4,5,8-dimethano-2-naphthyl)-6-methyluracil. |
| 2-(5,6,7,8-tetrachlorodecahydro-10,10-dimethoxy-1,4-5,8-methano-2-naphthyl)methylurea. | 3-[2-(5,6,7,8-tetrachlorodecahydro-10,10-dimethoxy-5,8-methano-2-naphthyl)methyl]-6-methyluracil. |
| 3a,4,5,6,7,7a-hexahydro-4,7-methano-5-indenylurea | 3-(3a,4,5,6,7,7a-hexahydro-4,7-methano-5-indenyl)-6-methyluracil. |

Table—Continued

| Urea reactant | Uracil product |
|---|---|
| 2,3-dichloro-3a,4,5,6,7,7a-hexahydro-4,7-methano-5-indanylurea | 3-(2,3-dichloro-3a,4,5,6,7,7a-hexahydro-4,7-methano-5-indanyl)-6-methyluracil. |
| α-Decahydro-1,4-5,8-dimethanonaphthylurea | 3-(α-decahydro-1,4-5,8-dimethanonaphthyl)-6-methyluracil. |
| 2-indanylurea | 3-(2-indanyl)-6-methyluracil. |
| (3a,4,5,6,7,7a-hexahydro-4,7-methano-5-indanyl)urea | 3-(3a,4,5,6,7,7a-hexahydro-4,7-methano-5-indanyl)-6-methyluracil. |
| Cyclopropylurea | 3-cyclopropyl-6-methyluracil. |
| (Cyclopropylmethyl)urea | 3-(cyclopropylmethyl)-6-methyluracil. |
| Cyclobutylurea | 3-cyclobutyl-6-methyluracil. |
| Cyclobutenylurea | 3-cyclobutenyl-6-methyluracil. |
| Cyclohexylethylurea | 3-cyclohexylethyl-6-methyluracil. |
| 1,2,3,4-tetrahydronaphth-2-ylurea | 3-(1,2,3,4-tetrahydronaphth-2-yl)-6-methyluracil. |
| Cyclobutylmethylurea | 3-cyclobutylmethyl-6-methyluracil. |
| 2,6-dimethylcyclohexylurea | 3-(2,6-dimethylcyclohexyl)-6-methyluracil. |
| 2,6-diethylcyclohexylurea | 3-(2,6-diethylcyclohexyl)-6-methyluracil. |
| (2-bicyclohexyl)urea | 3-(2-bicyclohexyl)-6-methyluracil. |
| 4-methoxycyclohexylurea | 3-(4-methoxycyclohexyl)-6-methyluracil. |
| 3,4-dimethoxycyclohexylurea | 3-(3,4-dimethoxycyclohexyl)-6-methyluracil. |

*Example 3.—Preparation of 3-cyclohexyl-6-methyluracil, sodium salt*

A solution of 4 parts of sodium hydroxide in 100 parts of water is treated with 20.8 parts of 3-cyclohexyl-6-methyluracil. The water is removed from the resulting solution under reduced pressure, leaving 3-cyclohexyl-6-methyluracil, sodium salt as a dihydrate. This salt melts at 265–290° C.

The alkali metal and alkaline earth metal salts of the compounds of Examples 1 and 2, and those compounds listed thereafter, can be similarly prepared by substituting equivalent amounts of the alkali metal and alkaline earths hydroxides or basic salts and equivalent amounts of the substituted uracils for the soduim hydroxide and 3-cyclohexyl-6-methyluracil.

*Example 4.—Preparation of 1:1 complex of cyclohexyl-6-methyluracil and pentachlorophenol*

A mixture of 208 parts of 3-cyclohexyl-6-methyluracil, 266 parts of pentachlorophenol and 1250 parts of cyclohexane is stirred at reflux as 50 parts of nitromethane are gradually added. The physical appearance of the solid changes rapidly. When no further change is noticed, the mixture is chilled and the solid product is filtered off and recrystallized from nitromethane.

The following complexes can be prepared in a similar fashion by substituting equivalent amounts of the proper phenol and uracil for the 3-cyclohexyl-6-methyluracil and pentachlorophenol:

1:1 complex phenol and 3-norbornyl-6-methyluracil
1:1 complex pentachlorophenol and 3-cyclopropyl-6-methyluracil
1:1 complex pentachlorophenol and 3-bornyl-6-methyluracil
1:1 complex pentachlorophenol and 3 - (2-indanyl) - 6-methyluracil
1:1 complex 3-methylphenol and 3-(3a,4,5,6,7,7a-hexahydro-4,7-methano-5-indanyl)-6-methyluracil
1:1 complex p-nitrophenol and 3-norbornenyl-6-methyluracil
1:1 complex p-methoxyphenol and 3-(cyclopenten-2-yl)-6-methyluracil

*Example 5.—Preparation of 1:2 complex of phenol and 3-cyclohexyl-6-methyluracil*

A dry mixture of 208 parts of 3-cyclohexyl-6-methyluracil and 47 parts of phenol is gradually heated until a clear melt is formed. This is stirred for a short time to insure complex formation, and then cooled. The resulting solid cake is sufficiently pure for incorporation into herbicidal formulations.

The following complexes can be formed in a like manner by substituting molecularly equivalent quantities of the appropriate phenols for phenol, and the appropriate uracils for 3-cyclohexyl-6-methyluracil:

1:2 complex p-chlorophenol and 3-cyclohexyl-6-methyluracil
1:2 complex p-nitrophenol and 3-cyclopentyl-6-methyluracil
1:2 complex p-methoxyphenol and 3-fenchyl-6-methyluracil
1:2 complex p-methylphenol and 3-(2-methylcyclohexyl)-6-methyluracil
1:2 complex pentachlorophenol and 3-(β-decahydronaphthyl)-6-methyluracil
1:2 complex pentachlorophenol and 3-(3a,4,5,6,7,7a-hexahydro-4,7-methano-5-indenyl)-6-methyluracil

*Example 6.—Preparation of 2:1 complex of 3-cyclohexyl-6-methyluracil and phenol*

A mixture of 208 parts of 3-cyclohexyl-6-methyluracil 1200 parts of cyclohexane and 47 parts of phenol is refluxed with stirring for from 5 to 30 minutes. This slurry is filtered while hot, and the solid filter cake is recrystallized from 300 parts of nitromethane. The pure 2:1 solid complex thus formed is filtered off, and dried at room temperature in air.

*Example 7.—Preparation of the addition compound of 3-cyclohexyl-6-propyluracil with dodecylamine*

A mixture containing 15 parts of 3-cyclohexyl-6-propyluracil and 85 parts of dodecylamine is stirred and gently heated. A clear solution is obtained which can be extended for use to any desired spray concentration with aromatic heavy naphtha or Lion Herbicidal Oil No. 6.

The addition compounds in the following list can be similarly prepared by substituting proper amounts of suitable reactants for 3-cyclohexyl-6-propyluracil and dodecylamine.

6-ethyl-3-(3-methylcyclohexyl)uracil–dodecylamine
6-ethyl-3-(3-methoxycyclohexyl)uracil–dodecylamine
6-ethyl-3-(2-methylcyclohexyl)uracil–oleyldiamine
3-norbornyl-6-propyluracil–dodecylamine
6-methyl-3-norbornyluracil–dodecylamine
3-norbornylmethyl-6-propyluracil–dodecylamine
3-cycloheptyl-6-ethyluracil–triethylamine
3-cyclooctyl-6-methyluracil–2-aminooctanol-1

*Example 8.—Preparation of the addition compound of 3-cyclooctyl-6-propyluracil with piperidine*

A mixture of one part of 3-cyclooctyl-6-methyluracil and four parts of piperidine is stirred with gentle heating until a clear solution is obtained.

This solution can be diluted to spray concentrations with herbicidal oils or water.

The following addition compounds can be similarly prepared by substituting proper amounts of suitable reactants for 3-cyclooctyl-6-propyluracil and piperidine:

3-(2-methylcyclohexyl)-6-ethyluracil–piperidine
3-norbornyl-6-propyluracil–piperidine 3-cycloheptyl-6-ethyluracil–2-methylpiperidine
3-cyclooctyl-6-methyluracil–piperidine
3-cyclodecyl-6-methyluracil–4-methylpiperidine
3-cyclohexylmethyl-6-propyluracil–piperidine
3-norbornylmethyl-6-methyluracil–piperidine

*Example 9.—Preparation of the tetrabutylammonium salt of 3-cyclohexyl-6-methyluracil*

A mixture containing 208 parts of 3-cyclohexyl-6-methyluracil and 865.8 parts of a one-molar solution of tetrabutylammonium hydroxide in methanol is stirred, with slight heating, until a clear solution forms. The solution is stripped to dryness at reduced pressure, and the resulting solid is recrystallized twice from 900 parts of ethylacetate. The pure tetrabutylammonium salt of 3-cyclohexyl-6-methyluracil thus formed melts at 164.5–167.5° C.

The following quaternary ammonium salts can be similarly prepared by reacting an appropriately substituted uracil with a suitable quaternary ammonium hydroxide:

3-cyclopropyl-6-methyluracil, tetrabutylammonium salt
3-cyclohexyl-6-methyluracil, dodecyltrimethylammonium salt
3-norbornyl-6-methyluracil, tetramethylammonium salt
3-cyclooctyl-6-methyluracil, tetrabutylammonium salt
3-cyclodecyl-6-methyluracil, tetrabutylammonium salt
3-cyclohexyl-6-ethyluracil, tetrabutylammonium salt
3-cyclopentenyl-6-methyluracil, tetrabutylammonium salt
3-cyclohexylmethyl-6-methyluracil, tetrabutylammonium salt
3-norbornylmethyl-6-methyluracil, tetrabutylammonium salt
3-cyclohexyl-6-propyluracil, tetrabutylammonium salt
3-cyclohexyl-6-methyluracil, benzyltrimethylammonium salt
3-norbornyl-6-methyluracil, benzyltrimethylammonium salt
3-(2-methylcyclohexyl)-6-methyluracil, dodecyltrimethylammonium salt

HERBICIDAL COMPOSITIONS
LIQUID FORMULATIONS

*Example 10.—Aqueous concentrate*

The following aqueous concentrate is prepared by dissolving or suspending the two solid components in water, with agitation. The product can be readily diluted to use levels and sprayed.

| | Percent |
|---|---|
| 3-cyclohexyl-6-methyluracil, sodium salt | 10 |
| Sodium lauryl sulfate | 1 |
| Water | 89 |

The following compounds can be substituted, in herbicidally equivalent amounts, for the 3-cyclohexyl-6-methyluracil, sodium salt, in the above formulation:

3-norbornyl-6-methyluracil, 2/1 6,7-dihydropyrido[1,2-a:2',1'-C]pyrazinium salt
3-cyclooctyl-6-butyluracil, sodium salt
3-cyclohexyl-6-methyluracil, potassium salt
3-cyclopentyl-6-methyluracil, tetrabutylammonium salt
3-(2-methylcyclohexyl)-6-ethyluracil, tetramethylammonium salt
3-cyclooctyl-6-amyluracil, 1/2 magnesium salt
3-cyclopentenyl-6-methyl-2-thiouracil, sodium salt
3-cycloheptyl-6-propyl-2-thiouracil, lithium salt
3-cyclohexyl-6-methyl-2-thiouracil, benzyltrimethylammonium salt
3-cyclohexenyl-6-ethyluracil, sodium salt
3-cyclohexyl-6-methyluracil, tetramethylammonium salt
3-cycloheptenyl-6-butyluracil, 1/2 strontium salt
3-norbornyl-6-methyluracil, triethyldodecylammonium salt
3-norbornenyl-6-methyluracil, sodium salt
3-(2-methylcyclohexyl)-6-methyluracil, potassium salt
3-(3,4-dimethylcyclohexyl)-6-methyluracil, sodium salt
3-norbornylmethyl-6-methyluracil, 1/2 calcium salt
3-(3a,4,5,6,7,7a-hexahydro-4,7-methano-5-indenyl)-6-methyluracil, sodium salt
3-fenchyl-6-methyluracil, sodium salt
3-(3a,4,5,6,7,7a-hexahydro-4,7-methano-5-indanyl)-6-methyluracil, sodium salt
3-(2-indanyl)-6-methyluracil, 1/2 barium salt When applied at 20 pounds of active ingredient per acre, these concentrates are useful for general control of annual and perennial weeds on industrial sites and railroad ballast.

3-norbornyl-6-methyluracil, 2/1 6,7-dihydropyrido[1,2-a:2',1'-C]pyrazinium salt, formulated in this way, can also be used as a directed post-emergence spray in sugarcane. When sprayed on emerging weeds (½–3" tall), when the cane is 18–24" tall, at the rate of 2½ pounds of active ingredient per acre in 40 gallons of water, this formulation controls crabgrass, foxtails, water grass, pigweed, lamb's-quarters, and valvetleaf. Residual preemergence control of weeds not emerged at the time of spraying is also observed.

*Example 11.—Aqueous suspension*

The following composition is mixed and pebble-milled or sand-milled until the particles of active material are under 5 microns in diameter. The resulting stable, thixotropic suspension does not cake on storage and is easily diluted with water to form a slow settling suspension which requires no agitation during application.

| | Percent |
|---|---|
| 3-cyclohexyl-6-methyluracil | 28.0 |
| Sodium lignin sulfonate | 15.0 |
| Hydrated attapulgite | 2.0 |
| Disodium phosphate | 0.8 |
| Sodium pentachlorophenate | 0.5 |
| Water | 53.7 |

When applied as a directed spray in 30 gallons of water, at a concentration of 2 pounds of active ingredient per acre, this suspension is useful for pre-emergence control of crabgrass, mustard species, lamb's quarters, cocklebur, and Johnson grass in sugar cane.

*Example 12.—Aqueous dispersion*

| | Percent |
|---|---|
| 3-cyclohexyl-6-ethyluracil | 20.00 |
| 2-chloro-4-ethylamino-6-isopropyl-amino-s-triazine | 10.00 |
| Sodium lignin sulfonate | 15.00 |
| Hydrated attapulgite | 1.75 |
| $Na_2HPO_4$ | 0.80 |
| Water | 52.45 |

The ingredients are mixed and sand-ground or ball-milled until the particles are less than 10 microns in size.

One gallon of this formulation is dispersed in 60 gallons of water and sprayed in early spring on one acre of sugar cane that has been shaved and off-barred. Good control of seedling Johnson grass, wild lettuce, crabgrass, pigweed, ragweed, spotted spurge, black nightshade, and foxtail is obtained.

*Example 13.—Aqueous dispersion*

| | Percent |
|---|---|
| 3-cycloheptyl-6-methyluracil | 25.00 |
| 3-amino-1,2,4-triazole | 8.00 |
| Sodium lignin sulfonate | 15.00 |
| Hydrated attapulgite | 1.75 |
| Water | 50.25 |

These components are mixed and ball-milled until the uracil particles are below 10 microns in size. The triazole dissolves to form a true solution.

This formulation is dispersed in water and sprayed at the rate of 20 pounds of active ingredients per acre in and around a transformer station to kill a dense growth of poison ivy, brambles, bouncing Bet, goldenrod, panic grass, and giant foxtail. The area remains free of weeds for an extended period.

*Example 14.—Aqueous dispersion*

|  | Percent |
|---|---|
| 3-cyclopentyl-6-methyluracil | 10 |
| 3-(3,4-dichlorophenyl)-1-n-butyl-1-methylurea | 20 |
| Sodium lignin sulfonate | 10 |
| Hydrated attapulgite | 2 |
| Water | 58 |

These components are milled together until the particles are under 10 microns in size.

After the surface of a clay tennis court is scraped free of weeds and before it is rolled smooth, this formulation is sprayed on at the rate of 18 pounds of active ingredients per acre in about 100 gallons of water. The court remains free from encroachment of surrounding turf grasses and of crabgrass, carpetweed, knotweed, yellow foxtail, goose grass, goldenrod, and aster for the season.

*Example 15.—Solution*

A mixture of 1 part 3-cyclohexyl-methyluracil and 9 parts ethanolamine is stirred and gently heated to form a clear solution.

This formulation is applied pre-emergence at the rate of 1 to 2 pounds (active) in 40 gallons of water to a field planted to sugar cane. Excellent control of seedling Johnson grass, ryegrass, crabgrass, foxtail, water grass, lamb's-quarters and wild mustard is obtained.

This formulation also gives post-emergence control of crabgrass and foxtail in established stands of sugar cane. Two pounds (active) are mixed in 40 gallons water. To this mixture is added 2½ pounds of a surfactant such as trimethylnonyl ether of polyethylene glycol. This mixture is applied as a directed spray to crabgrass and foxtail grasses 4 inches high, growing in sugar cane 12–14 inches high. Quick kill of these weeds is obtained.

The following addition compounds can be similarly formulated and used, pre-emergence, with substantially equivalent results:

3-cyclopentyl-6-propyluracil–methoxypropylamine
3-cyclohexyl-6-methyl-2-thiouracil–ethanolamine
3-cycloheptyl-6-ethyluracil–propanolamine
3-cyclooctyl-6-methyluracil–butanolamine
3-cyclohexyl-6-methyluracil–piperidine
3-cyclohexylmethyl-6-methyluracil–ethanolamine
3-(3-methylcyclohexyl)-6-methyluracil–ethanolamine
3-cyclopropyl-6-propyluracil–piperidine
3-cyclodecyl-6-methyluracil–ethanolamine
3-cyclopentenyl-6-ethyluracil–ethanolamine
3-(2-methylcyclohexyl)-6-methyluracil–ethanolamine
3-(3-methoxycyclohexyl)-6-methyluracil–propanolamine
3-cyclohexyl-6-methyluracil–ethanolamine
3-norbornyl-6-methyluracil–piperidine
3-norbornylmethyl-6-methyluracil–ethanolamine
3-norbornylmethyl-6-methyluracil–piperidine

*Example 16.—Tank mix*

A wettable powder of 3-cyclohexyl-6-methyluracil is prepared according to the following formula:

|  | Percent |
|---|---|
| 3-cyclohexyl-6-methyluracil | 80 |
| Dioctyl sodium sulfosuccinate condensed 85–15 with sodium benzoate | 2 |
| Partially desulfonated sodium lignin sulfonate | 1 |
| Calcined montmorillonite clay | 17 |

These components are blended, micropulverized, and then reblended.

Ninety-five parts of 2,4,5-trichlorophenoxy acetic acid, propylene glycol, butyl ether ester are blended with 5 parts of a polyoxyethylene ester of a fatty acid to make it emulsifiable.

Twenty pounds of the wettable powder and 4 pounds of the 2,4,5-trichlorophenoxyacetic acid, propylene glycol butyl ether ester (0.47 gallon of the emulsifiable formulation) are mixed in 100 gallons of water and sprayed on an acre of dense low growing brush and herbaceous perennial and annual weeds. Excellent control of scrub oak, brambles, honeysuckle, golden rod, black-eyed Susan, bouncing Bet, crabgrass, smartweed, and poison ivy is obtained.

*Example 17.—Tank mix*

3-cyclohexyl-6-methyluracil (80% wettable powder)
2,2-dichloropropionic acid, sodium salt A wettable powder of the uracil is made with the same surfactants and diluent as shown for Example 35 by replacing the substituted urea of that example with an additional 40% of the uracil to give an 80% wettable powder.

Ten pounds of this powder and 10 pounds of the sodium salt of 2,2-dichloropropionic acid are mixed in 100 gallons of water and sprayed on a railroad switch yard at the volume rate of 200 gallons per acre. This gives excellent control of a dense growth of Bermuda grass, Johnson grass, water grass, ragweed, goat weed, lamb's-quarters, and crabgrass.

*Example 18.—Tank mix*

A wettable powder is prepared according to the following formula:

|  | Percent |
|---|---|
| 3-cyclohexyl-6-isopropyluracil | 80 |
| Alkylaryl, polyether alcohol 40% active extended upon a siliceous base | 4 |
| Partially desulfonated calcium lignin sulfonate | 2 |
| Attapulgite clay | 14 |

These components are blended, micropulverized, and reblended.

A potato vine killing spray is prepared by tank-mixing 5 pounds of the wettable powder and 10 pounds of sodium arsenite in 100 gallons of water. This mixture is sprayed on the potato vines before harvest, killing them as well as such weeds as crabgrass, purslane, goose grass, and smartweed. The mechanical harvest of the potato tubers is thereby made easier.

*Example 19.—Emulsifiable oil*

The following emulsifiable oil is prepared by mixing the components until they form a homogeneous solution. It can be emulsified in water for application.

|  | Percent |
|---|---|
| 3-cyclohexyl-6-methyluracil | 20.0 |
| Alkyl aryl polyether alcohol | 2.5 |
| Oil soluble petroleum sulfonate | 2.5 |
| Methyl isobutyl ketone | 75.0 |

This emulsifiable oil is useful for weed control on railroad rights-of-way, in railroad yards, and sidings. When diluted with 100 gallons of water per acre and sprayed from a railroad spray car at a level of 20 pounds of active ingredient per acre, mixed vegetation such as quack grass, crabgrass, Bermuda grass, bromegrass, ragweed, cocklebur, lamb's-quarters, and mare's-tail is controlled for an extended period.

*Example 20.—Emulsifiable oil suspension*

The following components are mixed together and milled in a roller mill, pebble mill, or sand mill until the particles of the active component are under 10 microns in size. The resulting suspension can be emulsified in water or diluted further with weed oils for spray application.

|  | Percent |
|---|---|
| 3-cyclopentyl-6-propyluracil | 25 |
| Blend of polyalcohol carboxylic esters and oil soluble petroleum sulfonates | 6 |
| Diesel oil | 69 |

This formulation is diluted with 80 gallons of Lion Herbicidal Oil No. 6 and applied at 12 pounds of active ingredient per acre for the control of morning glory, yarrow, ragweed, wild carrot, quack grass, witch grass, crabgrass, and oak and maple seedlings growing along railroad rights-of-way. Excellent control is obtained.

*Example 21.—Oil dispersion*

|  | Percent |
|---|---|
| 3-cyclohexyl-6-methyluracil | 25 |
| 2,3,6-trichlorobenzoic acid | 50 |
| Polyoxyethylene lauryl ether | 5 |
| Diatomaceous silica | 20 |

These ingredients are blended and micropulverized. The resultant powder disperses readily in oil, with only mild agitation.

Four pounds of this oil-dispersible powder, mixed with 5 gallons of diesel oil and sprayed at the rate of 30 pounds of active ingredients per acre, gives good control of quack grass, trumpet vine, Virginia creeper, bindweed, crabgrass, barnyard grass, wooly croton, white clover, and brambles.

*Example 22.—Oil dispersion*

|  | Percent |
|---|---|
| 3-cyclopentyl-6-ethyluracil | 24 |
| 2-(2,4,5-trichlorophenoxy)propionic acid | 6 |
| Diesel oil | 70 |

These ingredients are mixed together and ball-milled or sand-milled until most of the particles are less than 10 microns in size.

This formulation is extended with 100 gallons of diesel oil and sprayed at the rate of 15 pounds of active ingredients per acre on a tangled growth of mixed woody and herbaceous perennial and annual weeds along a utility right-of-way. Good control of crabgrass, foxtail, barnyard grass, honeysuckle, poison ivy, poke weed, sunflower, trumpet vine, maples, oaks, horse weed, and thistles is obtained.

*Example 23.—Oil dispersion*

|  | Percent |
|---|---|
| 3-cyclohexyl-6-methyluracil | 15 |
| 3-(3,4-dichlorophenyl)-1,1-dimethylurea | 15 |
| Dormant or summer spray oil (Sovaspray No. 3) | 67 |
| Oil-soluble lecithin | 3 |

These components are mixed and ball-milled or sand-milled until the particles are under 10 microns in size.

This formulation is dispersed in 75 gallons of herbicidal oil and sprayed on an area surrounding oil storage tanks at 20 to 30 pounds of active ingredients per acre. The existing weed population of Bermuda grass, Johnson grass, horse nettle, black-eyed Susan, cocklebur, fall panicum, water grass, and panic grass is killed and the sprayed area remains free of weeds for an extended period.

SOLID FORMULATIONS

*Example 24.—Granules*

The following composition is prepared by dissolving the active ingredient in water and spraying the solution upon the attapulgite granules while they are being tumbled. The granules are then dried.

|  | Percent |
|---|---|
| 3-cyclohexyl-6-methyluracil, Na salt | 25 |
| Granular 8–15 mesh attapulgite clay | 75 |

These granules are applied by hand at 10 to 25 pounds of active ingredient per acre. They control pepper grass, smartweed, downy bromegrass, barnyard grass, goose grass, and quack grass on industrial sites, along boundary fences and railroad rights-of-way, in parking areas, along roadsides, and under billboards. Soil applications give control of woody plants such as oak, maple, sweet gum, and willow.

*Example 25.—Granules*

The following components are blended, micropulverized, moistened with water and granulated. The granules are then dried and screened.

|  | Percent |
|---|---|
| 3-cycloheptyl-6-methyluracil | 40 |
| Anhydrous sodium sulfate | 10 |
| Non-swelling sub-bentonite clay | 50 |

The granules are applied by hand for "spot treatments" of undesirable bunch grasses growing in agricultural areas. An application of 20 pounds of active ingredient per acre gives good control of seedling Dallis and Vasey grass.

*Example 26.—Granules*

|  | Percent |
|---|---|
| 3-cyclooctyl-6-methyluracil | 4 |
| Sodium chlorate, 40%–sodium metaborate, 58%–impurities, 2% | 96 |

A mixture of sodium chlorate, sodium metaborate and uracil is placed in a blender and blended. When this formulation is homogeneous, it is tumble-dried to give nonsegregating granules.

These granules are applied with a cyclone seeder at the rate of 1.25 pounds per 100 square feet to the area around stacks of lumber in a lumber yard for excellent control of Johnson grass, leafy spurge, toad flax, Jimson weed, horsenettle, dandelion, plantain, crabgrass, and bindweed. The area remains weed-free for several months.

*Example 27.—Granules*

|  | Percent |
|---|---|
| 3-cyclopentyl-6-methyluracil | 12.5 |
| 3-(p-chlorophenyl)-1,1-dimethylurea | 12.5 |
| Alkyl naphthalene sulfonic acid | 1.0 |
| Ca, Mg sub-bentonite | 32.0 |
| Kaolin clay | 32.0 |
| Sodium lignin sulfonate | 10.0 |

These ingredients are blended, micropulverized, mixed in a pug mill with 15–20% water, and then moist-granulated. The granules are dried and screened to minus 8 plus 30 mesh.

This formulation keeps the fenced enclosure around a radar installation free of weeds. An annual application spread by hand at the rate of 4 pounds per 1000 square feet gives excellent control of such weeds as honeysuckle, Johnson grass, Bermuda grass, big bluestem, brambles, and golden rod.

*Example 28.—Granules*

|  | Percent |
|---|---|
| 3-cyclohexyl-6-methyluracil | 1 |
| N-(m-chlorophenyl)carbamic acid, isopropyl ester | 4 |
| Attapulgite clay | 95 |

These components are mixed, micropulverized, moistened with water, granulated, dried, and then screened to 15–30 mesh granules.

This formulation is spread as a directed pre-emergence application in spinach at the rate of 2 pounds of active ingredient per acre. This treatment gives good control of purslane, chickweed, carpet weed, and crabgrass without injury to the spinach.

Example 29.—Pellets

| | Percent |
|---|---|
| 3-cyclohexyl-6-methyluracil | 13.3 |
| 3-sec-butyl-5-chloro-6-methyluracil | 6.7 |
| Sodium sulfate, anhydrous | 10.0 |
| Sodium lignin sulfonate | 10.0 |
| Ca, Mg sub-bentonite | 30.0 |
| Kaolin clay | 30.0 |

These components are blended, micropulverized, thoroughly mixed in a pug mill with 15–18% water, and extruded through 1/8″ orifices. The extrusions are cut into 1/8″ lengths and then dried.

These pellets are distributed along oil pipelines and around valves and vents at the rate of 2 to 3 pounds per 1000 square feet to give excellent control of vasey grass, Johnson grass, ragweed, pigweed, broomsedge, knotweed, smartweed, fall panicum, and other annual and herbaceous perennial weeds which, if allowed to grow, would cause a serious fire hazard and maintenance problem.

Example 30.—Pellets

| | Percent |
|---|---|
| 3-cyclohexyl-6-sec-butyluracil | 10 |
| 2-chloro-4,6-bis(methoxypropylamino)-s-triazine | 5 |
| Kaolin clay | 82 |
| Low viscosity methyl cellulose | 3 |

These components are blended, micropulverized, mixed with approximately 20% water, extruded, cut as 1/8″ x 1/8″ pellets, and dried.

This formulation is used in parks to keep weeds from growing around trail signs, trash cans, incinerators, bridge abutments, and toilet facilities. A handful spread over 10 square feet keeps the area free of poison ivy, golden rod, cocklebur, ragweed, coffee weed, chickory, panic grass, and crabgrass for the season.

Example 31.—Pellets

| | Percent |
|---|---|
| 3-cyclopentyl-6-methyluracil | 8.33 |
| 3-phenyl-1,1-dimethylurea | 16.67 |
| Sodium sulfate, anhydrous | 10.00 |
| Alkyl naphthalene sulfonic acid, Na salt | 1.00 |
| California Ca, Mg sub-bentonite | 64.00 |

These components are blended, micropulverized, moistened in a pug mill with approximately 20% water, extruded through 1/8″ holes, cut to 1/8″ lengths, and dried.

These 25% pellets are spread from the air at 100 pounds per acre on a power line right-of-way overgrown with seedling trees and brush. Excellent control of oak, elm, maple, and poplar is obtained without seriously depleting the low growing grasses and other ground cover.

Example 32.—Wettable powder

A wettable powder is prepared by blending the following components, micropulverizing them until the particles are below 50 microns in size and then reblending:

| | Percent |
|---|---|
| 3-cyclohexyl-6-methyluracil | 80.00 |
| Alkyl naphthalene sulfonic acid, sodium salt | 1.75 |
| Low viscosity methylcellulose | 0.25 |
| Disodium phosphate (corrosion inhibitor) | 0.80 |
| Attapulgite clay | 17.20 |

This wettable powder formulation is used for control of vegetation on industrial sites and railroad ballast. When applied at 10 to 20 pounds of active ingredient per acre in 100 gallons of water, excellent control of lamb's-quarters, goldenrod, evening primrose, pokeweed, oxeye daisy, cocklebur, goose grass, crabgrass, broomsedge, and love grass is obtained.

When a surfactant such as an alkylphenyl polyethylene glycol ether is added to the spray mixture described above, excellent contact action is obtained.

The following uracils can be formulated according to the same procedure, by substituting herbicidally equivalent amounts of the listed actives for 3-cyclohexyl-6-methyluracil. Excellent weed control results are obtained.

3-norbornyl-6-methyluracil
3-cyclopropyl-6-ethyluracil
3-(3a,4,5,6,7,7a-hexahydro-4,7-methano-5-indenyl)-6-methyluracil
3-(3a,4,5,6,7,7a-hexahydro-4,7-methano-5-indanyl)-6-methyluracil
3-norbornenyl-6-methyluracil
3-bornyl-6-methyluracil
3-(α-decahydronaphthyl)-6-methyluracil
3-(2,3-dichloro-3a,4,5,6,7,7a-hexahydro-4,7-methano-5-indanyl)-6-methyluracil

Example 33.—Wettable powder

The following components are blended, micropulverized until the solids are under 50 microns in particle size, and then reblended to homogeneity:

| | Percent |
|---|---|
| 3-(2-methylcyclohexyl)-6-methyluracil | 80.0 |
| Sodium lauryl sulfate | 0.6 |
| Sodium lignin sulfonate | 2.0 |
| Kaolin clay | 17.4 |

This formulation is used for control of vegetation on industrial sites and railroad ballast. When applied at 20 pounds of active ingredient per acre in 50 gallons of water, excellent pre- and post-emergence control of quack grass and bromegrass is obtained.

Example 34.—Wettable powder

The following powder is prepared in the same manner as in Example 33, but in addition is passed through an air attrition mill, such as an air-reductionizer, to reduce the particle size to below 10 microns:

| | Percent |
|---|---|
| 3-cyclopentenyl-6-methyluracil | 80.0 |
| Dioctyl sodium sulfosuccinate concreted with sodium benzoate (Aerosol OTB) | 2.0 |
| Partially desulfonated sodium lignin sulfonate | 1.0 |
| Calcined, non-swelling montmorillonoid type clay (Pikes Peak clay) | 17.0 |

This composition is used for pre-emergence application in agricultural crops such as sugar cane, asparagus, and safflower. It is dispersed in 40 gallons of water and sprayed with a pressure sprayer. When applied at 0.5 to 2.0 pounds of active ingredient per acre, excellent control of pigweed, lamb's-quarters, purslane, mustard, crabgrass, foxtail, and water grass is obtained.

Example 35.—Wettable powder

| | Percent |
|---|---|
| 3-cyclohexyl-6-methyluracil | 40.00 |
| 3-(p-chlorophenyl)-1,1-dimethylurea | 40.00 |
| Alkyl naphthalene sulfonic acid, Na salt | 1.75 |
| Partially desulfonated Ca lignin sulfonate | 1.00 |
| Attapulgite clay | 17.25 |

The components above are blended together, micropulverized until the particles are below 50 microns in size, and then reblended.

This formulation is useful for the control of annual and perennial weed seedlings in asparagus beds. At combined rates of 2 pounds of active ingredients per acre, applied to the disk beds before the cutting season and again after the cutting season, the asparagus planting remains free of such troublesome weeds as crabgrass, fall panicum, ragweed, pigweed, smartweed, annual morning glory, and seedling Johnson grass.

Example 36.—Wettable powder

| | Percent |
|---|---|
| 3-cyclohexyl-6-methyluracil | 50.0 |
| 2-chloro-4,6-bis(ethylamino)-s-triazine | 25.0 |
| Polyoxyethylated nonylphenol | 3.0 |
| Low viscosity polyvinyl alcohol | 0.5 |
| Calcined montmorillonite clay (Pikes Peak clay) | 21.5 |

This formulation is dispersed in water and sprayed at the rate of 25 pounds of active ingredients per acre to control a wide variety of grasses and broadleaved weed species growing along a railroad right-of-way. Good control of watergrass, crabgrass, broomsedge, ragweed, croton weed, golden rod, lamb's-quarters, plantain, and wild carrot is obtained.

Example 37.—Wettable powder

| | Percent |
|---|---|
| 3-cyclohexyl-6-methyluracil | 53.30 |
| 3-isopropyl-5-bromo-6-methyluracil | 26.70 |
| Dioctyl sodium sulfosuccinate 85–15 condensate with sodium benzoate | 1.00 |
| Ditertiary acetylenic glycol (Surfynol 104) | 0.50 |
| Low viscosity methyl cellulose | 0.25 |
| Attapulgite clay | 18.25 |

A spray mixture containing 24 pounds of the 80% formulation per 100 gallons is sprayed at a volume rate of 150 gallons per acre around the edge of an airport runway and on the area which extends away from the ends of the runway to give good control of existing seedling maples, oaks, hickorys, and such herbaceous perennial and annual weeds as Johnson grass, smartweed, ragweed, annual morning glory, mare's-tail, pokeweed, pigweed, purple top, and panic grass. The area remains free of weeds for an entire season.

Example 38.—Wettable powder

| | Percent |
|---|---|
| 3-cyclohexyl-6-methyluracil 3:1 complex with phenol | 75.0 |
| Sodium lauryl sulfate | 0.6 |
| Sodium lignin sulfonate | 2.0 |
| Calcined montmorillonite clay (Pikes Peak clay) | 22.4 |

These ingredients are blended and micropulverized until the crystalline addition compound particles are below 50 microns in diameter. The mixture is then reblended.

This wettable powder is useful for weed control on railroad rights-of-way, sidings, and yards. When diluted with 100 gallons of water and sprayed at the rate of 10 to 20 pounds of active ingredient per acre, an application will control mixed vegetation such as quack grass, crabgrass, seedling Bermuda grass, bromegrass, ragweed, cocklebur and lamb's-quarters.

The following uracil complexes can be substituted, in herbicidally equivalent amounts, for the 3-cyclohexyl-6-methyluracil-2:1 complex with phenol with excellent results.

2:1 complex phenol and 3-cyclopentyl-6-methyluracil
2:1 complex phenol and 3-cyclopropyl-6-methyluracil
1:1 complex pentachlorophenol and 3-cyclopentyl-6-methyluracil
1:1 complex pentachlorophenol and 3-norbornyl-6-methyluracil
1:1 complex p-chlorophenol and 3-(3a,4,5,6,7,7a-hexahydro-4,7-methano-5-indanyl)-6-methyluracil
1:1 complex p-methoxyphenol and 3-(2-methylcyclohexyl)-6-methyluracil

Example 39.—Wettable powder

| | Percent |
|---|---|
| 3-cyclopropyl-6-methyluracil | 50.00 |
| Alkylnaphthalene sulfonic acid, sodium salt | 1.75 |
| Partially desulfonated sodium lignin sulfonate | 1.00 |
| Calcined montmorillonite clay | 47.25 |

These ingredients are blended, micropulverized until all particles are below 50 microns in diameter, then reblended until homogeneous.

This formulation, at 15 pounds (active) per acre, is applied around farm buildings for excellent control of crabgrass, foxtail, chickweed, flower-of-an-hour, catnip and pigweed.

The following compounds are formulated and used in the manner described above with excellent results:

3-(α-ethylbicyclo[2,2,2]oct-5-enylmethyl-6-methyluracil
3-norbornenylmethyl-6-methyl-2-thiouracil
3-cyclopentenylmethyl-6-ethyluracil
3-(4-methylcyclohexenylmethyl)-6-methyluracil
3-(4-isopropylcyclohexyl)-6-methyluracil
3-(4-methoxycyclohexylmethyl)-6-ethyluracil
3-(4-bromocyclohexylmethyl)-6-methyluracil
3-(1,4,5,6-tetrachloro-7,7-dimethoxybicyclo[2,2,1]hept-5-en-2-ylmethyl)-6-methyluracil
3-(hexahydroindan-5-ylmethyl)-6-methyluracil
3-[2-(5-indanyl)ethyl]-6-methyluracil
3-(cyclohexene-1-ylmethyl)-6-methyl-2-thiouracil
3-(3a,4,5,6,7,7a-hexahydroinden-5-ylmethyl)-6-methyluracil

Example 40.—Water soluble powder

| | Percent |
|---|---|
| 3-cyclohexyl-6-methyluracil | 40 |
| Sodium metasilicate | 40 |
| Potassium carbonate | 15 |
| Sodium dioctyl sulfosuccinate | 1 |
| Finely divided synthetic silica | 2 |
| Urea | 2 |

These ingredients are blended, micropulverized until the average particle size is below 50 mesh, and are then reblended until homogeneous.

Eight pounds (active) of this formulation are added to 80 gallons of water and applied, at the rate of 80 gallons per acre, to young weeds growing along roadsides. Excellent control of fall panicum, crabgrass, purslane, foxtail, velvet leaf, and pigweed is obtained.

Example 41.—Water soluble powder

| | Percent |
|---|---|
| 3-cyclohexyl-6-methyluracil, sodium salt | 96.0 |
| Sodium dioctyl sulfosuccinate | 1.0 |
| Finely divided synthetic silica | 3.0 |

These ingredients are blended until homogeneous, the larger particles being reduced in size by passage of the formulation through a 50-mesh screen.

This formulation is applied, at the rate of 20 pounds (active) per acre in 160 gallons of water, along roadsides for control of annual and perennial weeds. Excellent control of crabgrass, jungle rice grass, fireweed, bristly foxtail, barnyard grass and Bermuda grass is obtained.

The embodiments of the invention in which an exclusive property or privilege is claimed are:

1. A method for the control of undesirable vegetation, said method comprising applying to a locus to be protected from said vegetation a herbicidally effective amount of at least one compound selected from the group consisting of (a) compounds of the formula

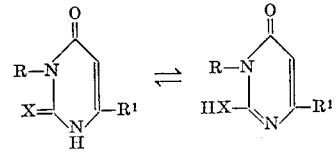

where
R is selected from the group consisting of cycloalkyl of 3 through 12 carbon atoms, cycloalkenyl of 4 through 12 carbon atoms, cycloalkyl alkyl of 4 through 13 carbon atoms, and cycloalkenyl alkyl of 4 through 13 carbon atoms;

$R_1$ is alkyl of 1 through 5 carbon atoms; and

X is selected from the group consisting of oxygen and sulfur; and (b) the sodium, potassium, lithium, calcium, magnesium, barium, strontium, iron, manganese and quaternary ammonium salts of the compounds in (a).

2. The method of claim 1 wherein the herbicidal active compound is 3-cyclohexyl-6-methyluracil, sodium salt.

3. The method of claim 1 wherein the herbicidal active compound is 3-norbornyl-6-methyluracil.

4. The method of claim 1 wherein the herbicidal active compound is 3-(3a,4,5,6,7,7a-hexahydro-4,7-methano-5-indenyl)-6-methyluracil.

5. The method of claim 1 wherein the herbicidal active compound is 3-cyclohexylmethyl-6-methyluracil.

6. The method of claim 1 wherein the herbicidal active compound is 3-(4-methoxycyclohexyl)-6-methyluracil.

7. The method of claim 1 wherein the herbicidal active compound is 3-cyclooctyl-6-methyluracil.

8. The method of claim wherein the herbicidal active compound is 3-cyclohexyl-6-methyluracil.

9. The method of claim 1 wherein the herbicidal active compound is 3-cyclohexyl-6-ethyluracil.

10. The method of claim 1 wherein the herbicidal active compound is 3-cyclophentyl-6-methyluracil.

11. A method for the control of undesirable vegetation, said method comprising applying to a locus to be protected from said vegetation a herbicidally effective amount of at least one compound selected from the group consisting of (a) compounds of the formula

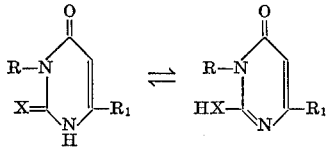

where

R is selected from the group consisting of cycloalkyl of 3 through 12 carbon atoms, cycloalkenyl of 4 through 12 carbon atoms, cycloalkyl alkyl of 4 through 13 carbon atoms, and cycloalkenyl alkyl of 4 through 13 carbon atoms;

$R_1$ is alkyl of 1 through 5 carbon atoms; and

X is selected from the group consisting of oxygen and sulfur;

(b) the sodium, potassium, lithium, calcium, magnesium, barium, strontium, iron, manganese, and quaternary ammonium salts of the compounds in (a);

(c) compounds of the formula

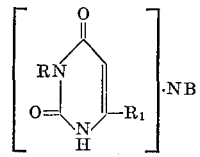

where

R and $R_1$ are as defined above, and

NB is a nitrogenous base having an ionization constant $K_b$ of $\geqslant 10^{-9}$ in water; and (d) compounds of the formula

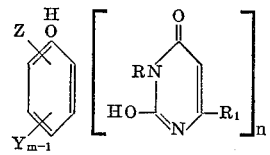

where

R and $R_1$ are as defined above;

Z is selected from the group consisting of hydrogen, bromine, chlorine, nitro, alkyl of 1 through 3 carbon atoms, and $-OR_2$ where $R_2$ is alkyl of 1 through 3 carbon atoms;

Y is selected from the group consisting of chlorine and alkyl of 1 through 3 carbon atoms;

m is a number 1 through 5; and n is selected from the group consisting of 1 and 2.

References Cited by the Examiner

UNITED STATES PATENTS

| | | | |
|---|---|---|---|
| 2,567,651 | 9/1951 | Papesch et al. | 260—260 |
| 2,688,020 | 8/1954 | Mackay et al. | 260—260 |
| 2,969,364 | 1/1961 | Lyttle | 71—2.5 X |
| 3,002,975 | 10/1961 | Slezak | 71—2.5 X |
| 3,078,154 | 2/1963 | Gysin et al. | 71—2.5 |
| 3,086,854 | 4/1963 | Harvey | 71—2.5 |

OTHER REFERENCES

Bonner et al.: Proc. Natl. Acad. Sci., 25, 184–188 (1939).

Thompson et al.: Botanical Gazette, 107, 475–507 (1946).

LEWIS GOTTS, *Primary Examiner.*

JULIAN S. LEVITT, *Examiner.*